US 012122620B1

(12) United States Patent
Kalm et al.

(10) Patent No.: US 12,122,620 B1
(45) Date of Patent: Oct. 22, 2024

(54) VARIABLE SLOT CONVEYOR IN FINAL SEGMENT OF DELIVERY

(71) Applicant: Amazon Technologies, Inc., Seattle, WA (US)

(72) Inventors: William Scott Kalm, Seattle, WA (US); Sean O Maylone, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 453 days.

(21) Appl. No.: 17/479,787

(22) Filed: Sep. 20, 2021

(51) Int. Cl.
| | |
|---|---|
| *B65G 67/08* | (2006.01) |
| *B65G 1/133* | (2006.01) |
| *B65G 1/137* | (2006.01) |
| *B65G 15/44* | (2006.01) |
| *B65G 43/08* | (2006.01) |
| *B65G 47/82* | (2006.01) |
| *B65G 47/84* | (2006.01) |

(52) U.S. Cl.
CPC ............. *B65G 67/08* (2013.01); *B65G 1/133* (2013.01); *B65G 1/1375* (2013.01); *B65G 15/44* (2013.01); *B65G 43/08* (2013.01); *B65G 47/82* (2013.01); *B65G 47/841* (2013.01)

(58) Field of Classification Search
CPC ........ B65G 47/82; B65G 43/08; B65G 1/133; B65G 1/1375; B65G 15/44; B65G 15/42; B65G 47/841; B65G 67/08
USPC ...................................... 198/697, 419.3, 732
See application file for complete search history.

(56) References Cited

U.S. PATENT DOCUMENTS

| | | | | | |
|---|---|---|---|---|---|
| 3,534,848 | A | * | 10/1970 | Frederick ............... | B65G 19/26 415/5 |
| 5,046,600 | A | * | 9/1991 | Cerf ......................... | B65B 9/02 198/779 |
| 5,662,208 | A | * | 9/1997 | Drewitz ................. | B65G 17/16 198/550.7 |
| 8,490,775 | B2 | * | 7/2013 | Volk ..................... | B65G 47/082 198/459.8 |
| 8,944,236 | B2 | * | 2/2015 | Fourney ............. | B65G 47/8823 198/779 |
| 2007/0209909 | A1 | * | 9/2007 | Fourney ............... | B65G 47/841 198/728 |
| 2015/0360871 | A1 | * | 12/2015 | Westergaard Andersen ................ | B65G 17/08 198/617 |
| 2023/0303328 | A1 | * | 9/2023 | Gil ......................... | B65G 47/53 |

FOREIGN PATENT DOCUMENTS

WO   WO-9414687 A1 *   7/1994   ............. B65G 15/44

* cited by examiner

*Primary Examiner* — James R Bidwell
(74) *Attorney, Agent, or Firm* — Kilpatrick Townsend & Stockton LLP

(57) ABSTRACT

An item delivery system can include a conveyor. The conveyor can be positioned in a delivery vehicle, for example. The conveyor can include a conveyance surface for receiving items and dividers. While remaining coupled with the conveyance surface, the dividers can move between a storage configuration and an operating configuration. In the operating configuration, the dividers can be positioned between the items. The conveyor can move the items to a position for removal. The removal position may correspond to an area accessible from an operator area of the delivery vehicle, for example.

19 Claims, 13 Drawing Sheets

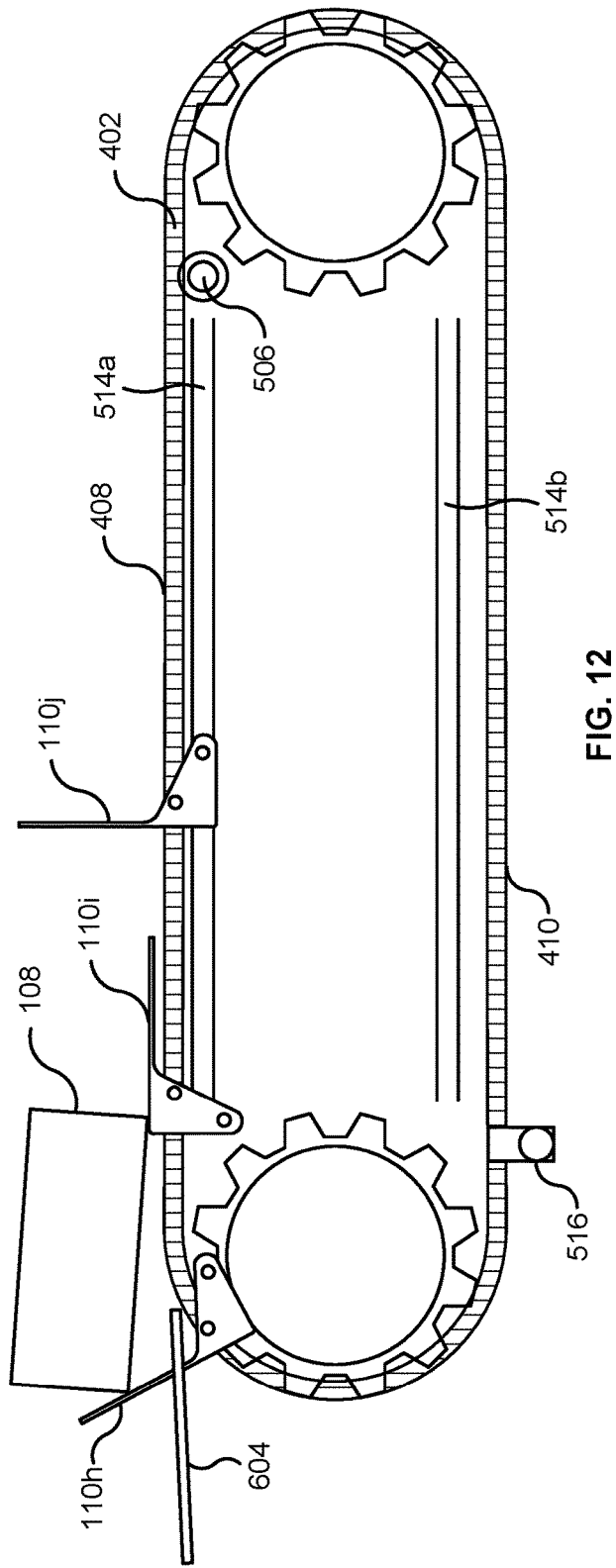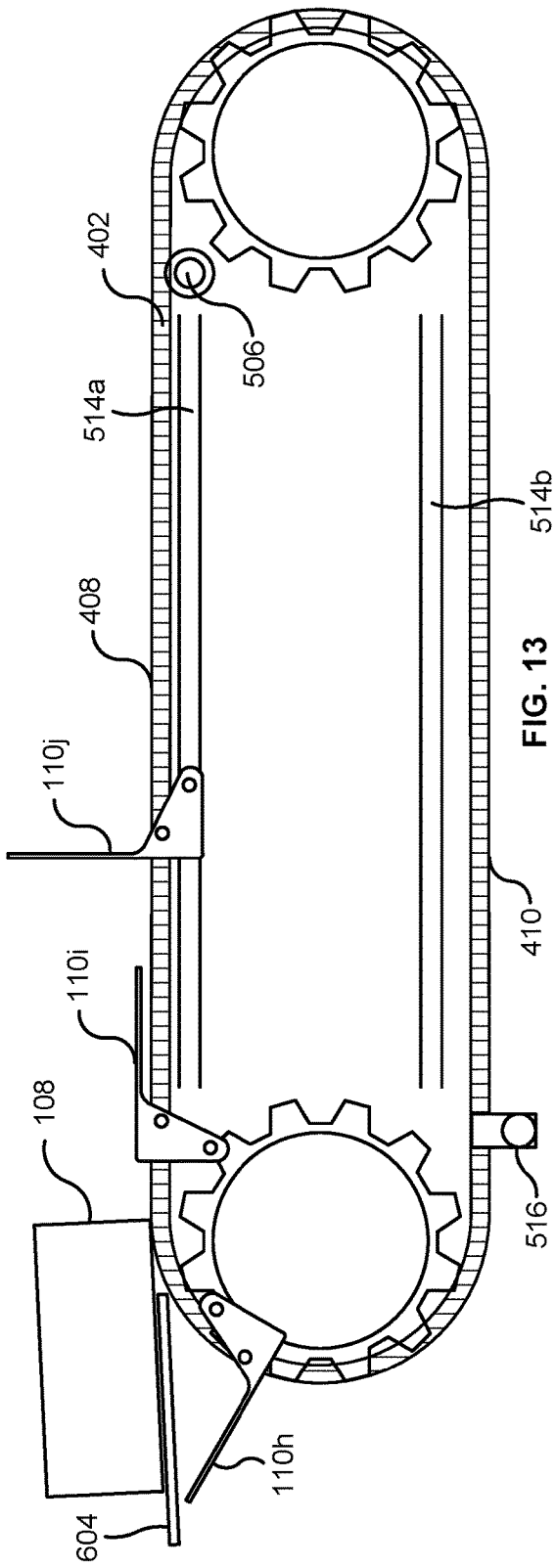

VARIABLE SLOT CONVEYOR IN FINAL SEGMENT OF DELIVERY

BACKGROUND

Items can be delivered using postal services, courier services, or other similar services. However, prior to delivery, the items are typically sorted and packaged in a warehouse facility. The sorting and packaging of individual or grouped items can be a time intensive process and the packaging material is often discarded shortly after the item is delivered. The items can be shipped to customers using traditional delivery methods, however, these delivery methods can be long and slow and can cause the items to be moved and handled frequently. Additionally, items that are being shipped to customers located in a similar area are often shipped separately and delivered to the customers using delivery vehicles with limited capacity.

BRIEF DESCRIPTION OF THE DRAWINGS

Various embodiments in accordance with the present disclosure will be described with reference to the drawings, in which:

FIGS. 8 through 15 illustrate various state of components that may be implemented in a simplified example process for delivering items using the item delivery system of FIG. 1.

DETAILED DESCRIPTION

Figure 1:
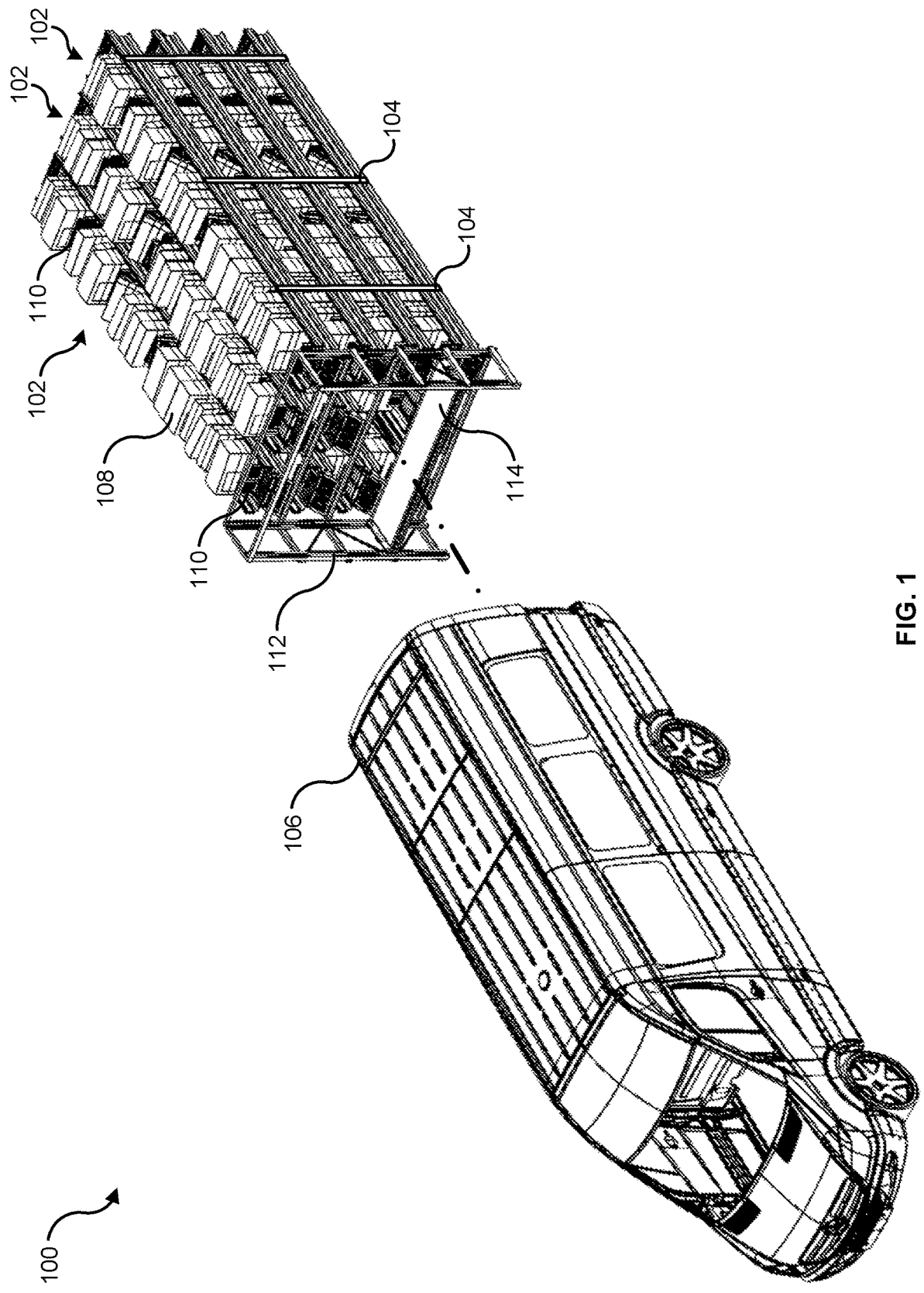
FIG. 1 is an exploded view that illustrates an item delivery system positioned in an item delivery vehicle, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, system and techniques relating to an item delivery system for moving items, but particular examples are described that include conveyors that can receive one or more inventory items. The conveyors can include dividers that can be moved between a storage configuration, where the divider lays flat against the conveyor, and an operating configuration, where the divider stands upright. The dividers can be activated (e.g., moved between the storage configuration and the operating configuration) based on a dimension of an item received on the conveyor. For example, dividers positioned further apart than the length of the package can be activated and the package can be positioned between the dividers. The activated dividers may function as constraints to prevent sliding along the conveyor and/or to otherwise maintain the item (or a set of items) separated from other items and/or keep the item or a set of items in place during transport.

The items can be moved along the length of the conveyor to a position for unloading of the items. The items can be unloaded onto an unloading device positioned at the end of the conveyors. The unloading device can position the items for removal (e.g., from the unloading device) by a user.

Turning now to a particular example, in this example, an item delivery system positioned in a truck or other item delivery vehicle is provided. A support structure can be positioned in the truck or other item delivery vehicle and include levels of conveyors positioned vertically above one another. The conveyors can include rotatable dividers and a conveyance surface that can receive items. The rotatable dividers can rotate between a storage configuration, where the rotatable dividers lay flat against the conveyance surface, and an operating configuration, where the dividers extend vertically away from the conveyance surface. The rotatable dividers can be separated by a set distance (e.g., by at least the height of the rotatable dividers). The items can be received on the conveyance surface between the rotatable dividers. For example, first and second rotatable dividers can be activated (e.g., positioned in the operating configuration) and an item can be positioned between the first and second rotatable dividers. The first and second rotatable dividers can be activated based on a dimension of the item (e.g., based on the length of the item). For example, a first rotatable divider can be activated and a second rotatable divider can be activated that is further away from the first rotatable divider than the length of the item. The item can be transported (e.g., by the conveyance surface) to a position for depositing the items onto an unloading device. The unloading device can move the items to a position to be received by a user.

Turning now to the figures, FIG. 1 shows an exploded view of an item delivery system 100. The item delivery system 100 can include conveyors 102 attached to a support structure 104. The support structure 104 and the conveyors 102 can be positioned in an item delivery vehicle 106. The conveyors 102 can receive items 108 between dividers 110 coupled with the conveyors 102 (e.g., with conveyance surfaces of the conveyors 102). The conveyors 102 can move the items 108 in one or more directions (e.g., forward or backward along the length of the conveyors 102). While remaining coupled with the conveyors 102, the dividers 110 can move between a storage configuration (e.g., a storage configuration or a storage position) and an operating configuration (e.g., an operating configuration or an operating configuration). In the storage configuration, the dividers 110 can be substantially flattened against the conveyors 102 (e.g., against the conveyance surface). In the operating configuration, the dividers 110 can extend substantially vertical from the conveyors 102 (e.g., stand substantially upright).

The conveyors 102 can transport the items 108 (e.g., positioned between the dividers 110) to an unloading device 112. The unloading device 112 can include an unloading conveyor 114 for receiving the items 108. The unloading conveyor 114 can move along the height of the unloading device 112 (e.g., up and down) to receive the items 108 from the conveyors 102. The unloading conveyor 114 can move the items 108 for removal from the unloading conveyor 114. For example, the unloading conveyor 114 can move the items 108 left to right to position the items 108 at a location for removal of the items 108.

The items 108 can be or include items (e.g., inventory items), for example, inventory items ordered by a user. However, the items 108 may be or include packaging, bags, bins, boxes, totes, containers, and/or any suitable container that can contain one or more inventory items. In some embodiments, the items 108 can be or include fruit, produce, grains, flowers, and/or any suitable perishable or non-perishable food items.

In various embodiments, the item delivery vehicle 106 can transport the item delivery system 100. For example, the item delivery vehicle 106 can include a drivetrain (e.g., wheels) that can be used to move the item delivery vehicle 106. The item delivery vehicle 106 can move along a pre-determined delivery route. For example, a route with delivery locations may be determined prior to the item delivery vehicle 106 leaving a loading area and/or before the items 108 are positioned on the conveyors 102. The item delivery vehicle 106 can be operated by a user (e.g., by an operator). However, the item delivery vehicle 106 may be remotely and/or autonomously controlled. The item delivery vehicle 106 can be or include a truck, a van, a car, an unmanned vehicle, a trailer with a drivetrain, and/or any suitable vehicle for delivering the items 108.

Figure 2:
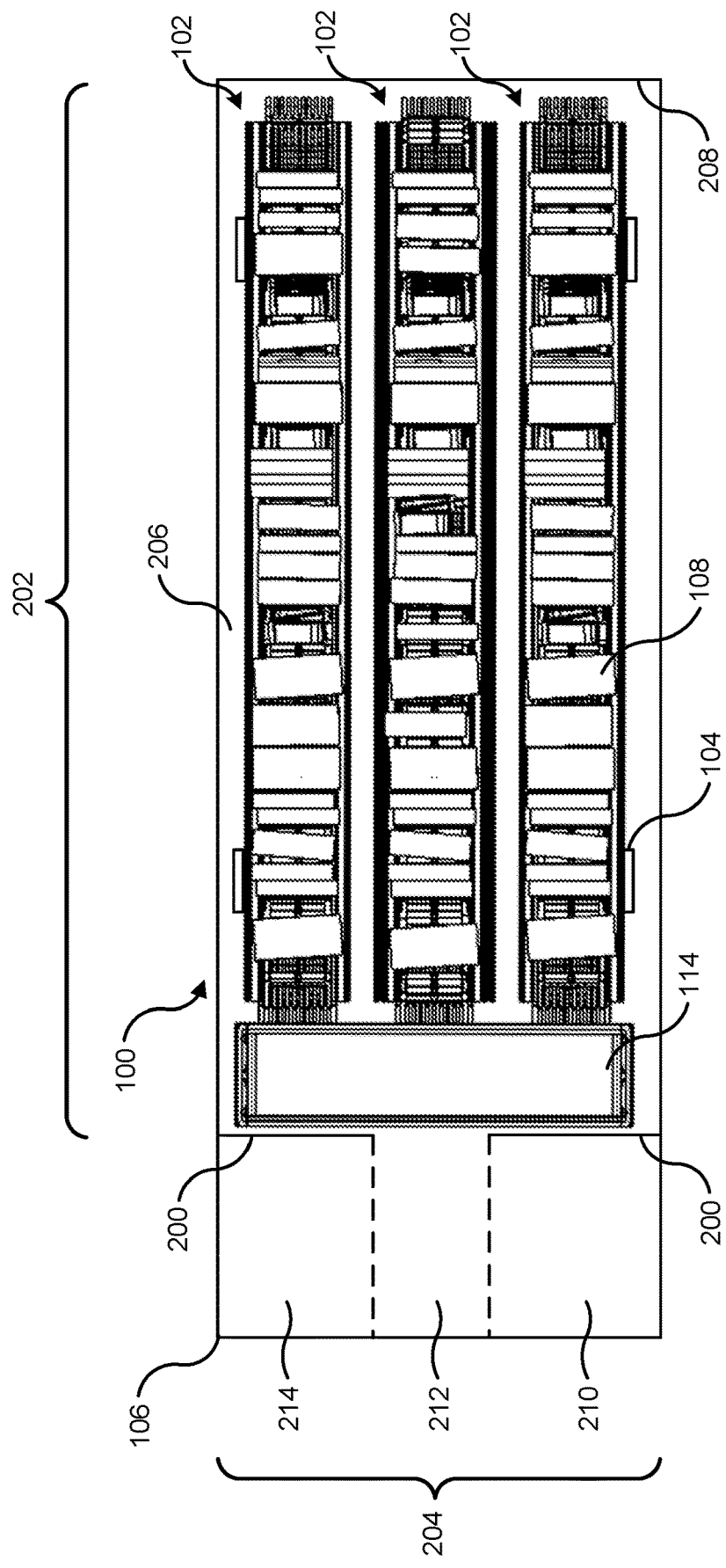
FIG. 2 is a top view that illustrates the item delivery system positioned in the item delivery vehicle of FIG. 1, according to various embodiments.

Turning to FIG. 2, a top view of the item delivery system 100 positioned in the item delivery vehicle 106 is shown. The item delivery vehicle 106 can be separated into various zones. The zones can be separated with a physical divider 200 (e.g., a wall), however, the zones may be not physically separated and zone may refer to a general area of the item delivery vehicle 106. The item delivery vehicle 106 can include an inventory item area 202 and an operator area 204. In some embodiments, the inventory item area 202 and the operator area 204 can at least partially be separated by the physical divider 200. For example, the physical divider 200 can at least partially separate an operator from the inventory item area 202 when the operator is driving the item delivery vehicle 106 or otherwise present in the vehicle at or between stops. In further embodiments, the physical divider 200 can have an opening where a user and/or an operator can receive an item 108 (e.g., from the unloading conveyor 114).

In various embodiments, the inventory item area 202 and/or the operator area 204 can include sub-areas. For example, the inventory item area 202 can include a delivery system area 206. The item delivery system 100 can be positioned in the delivery system area 206. For example, various elements of the item delivery system 100 can be mounted to the item delivery vehicle 106 (e.g., onto the floor, ceiling, and/or another interior wall of the item delivery vehicle 106). For example, the support structure 104 can be mounted to the item delivery vehicle 106. However, the item delivery system 100 may be moveable into and/or out of the item delivery vehicle 106. For example, the item delivery system 100 can be loaded with items 108 outside of the item delivery vehicle 106 and loaded into the item delivery vehicle 106.

In some embodiments, the inventory item area 202 can include access doors 208. The access doors 208 can allow a user and/or an operator to access the inventory item area 202. For example, a user and/or an operator can access the inventory item area 202 (e.g., via the access doors 208) to deposit items 108 onto the conveyors 102 and/or receive items 108 from the conveyors 102. Additionally or alternatively, the access doors 208 can allow some or all of the item delivery system 100 to be moved into and/or out of the item delivery vehicle 106.

The conveyors 102 can move the items 108 towards the operator area 204 and/or towards the access doors 208. For example, a first conveyor 102 can transport the items 108 towards the operator area 204 and a second conveyor 102 can transport the items 108 towards the access doors 208. The items 108 that are moved towards the operator area 204 can be received by a user and/or an operator (e.g., for delivery). The items 108 that are moved towards the access doors 208 can be items 108 that are accessible through the access doors 208 and/or items 108 that were not able to be delivered to a customer (e.g., by a user and/or an operator). For example, the items 108 that are moved towards the access doors 208 can be items 108 that are above a predetermined size threshold (e.g., oversized items 108).

In some embodiments, one or more of the conveyors 102 can receive items 108 from the operator area 204 (e.g., by a user and/or an operator). The conveyors 102 can receive the items 108 from the operator area 204 and move the items 108, for example, towards the access doors 208. The items 108 received from the operator area 204 can be or include items 108 being returned and/or items 108 that cannot be delivered.

In various embodiments, a robotic manipulator can interact with elements of the item delivery system and/or the item delivery vehicle 106. The robotic manipulator can be mounted to the item delivery vehicle 106. For example, the robotic manipulator can be mounted in the inventory item area 202 and/or the operator area 204. In some embodiments, the robotic manipulator can be positioned outside of the item delivery vehicle 106 and interact with the items 108 and/or the item delivery system 100 via the access doors 208. For example, the robotic manipulator can be mounted to an exterior area of the item delivery vehicle 106 and/or separate from the item delivery vehicle 106 and a portion of the robotic manipulator can enter the item delivery vehicle 106 (via access doors 208). The robotic manipulator can include an end effector for interacting with the item delivery system 100 and/or the items 108. The robotic manipulator can be or include a robotic arm, an unmanned aerial vehicle, an unmanned vehicle, and/or any suitable manipulator for interacting with the item delivery system 100 and/or the items 108. For example, the robotic manipulator can be or include a robotic manipulator with an end effector that can remove the items 108 from the conveyors 102.

In various embodiments, the operator area 204 can include one or more sub-areas. For example, the operator area 204 can include a driving area 210, an item removal area 212, and/or a packaging area 214. The driving area 210 can be or include an area where a user (e.g., a driver and/or an operator) can operate the item delivery vehicle 106. For example, the driving area 210 can include a seat, a steering apparatus, and control pedals that can allow the user to control the item delivery vehicle 106 (e.g., drive the truck along a delivery route). However, the driving area 210 can be or include an area (e.g., a protected area) where a user can stand when the item delivery vehicle 106 is in motion. For example, the driving area 210 can be a protected area where a user can stand while the item delivery vehicle 106 is being remotely and/or autonomously driven.

The item removal area 212 can be used to access items 108 positioned on the unloading conveyor 114. For example, the item removal area 212 can allow a user and/or an operator to remove items 108 from the unloading conveyor 114. The item removal area 212 can include an opening in the physical divider 200 such that a user and/or an operator can access the items 108, the unloading conveyor 114, and/or the conveyors 102. For example, the opening in the physical divider 200 can be or include a window where the unloading conveyor 114 can position the items 108 for removal by a user and/or an operator.

The packaging area 214 can be or include an area for positioning packaging (e.g., packaging from the items 108). For example, a user can remove an item 108 from a carrier and remove the packaging of the item 108. The packaging can then be positioned in the packaging area (e.g., for recycling the packaging and/or reusing the packaging). In some embodiments, the packaging area 214 can be or include a container for collecting the packaging. Additionally or alternatively, the packaging area 214 may be or include a designated area for putting packaging so that it does not interfere with a user (e.g., when the user is driving or interacting with the items 108 and/or the unloading conveyor 114).

Figure 3:
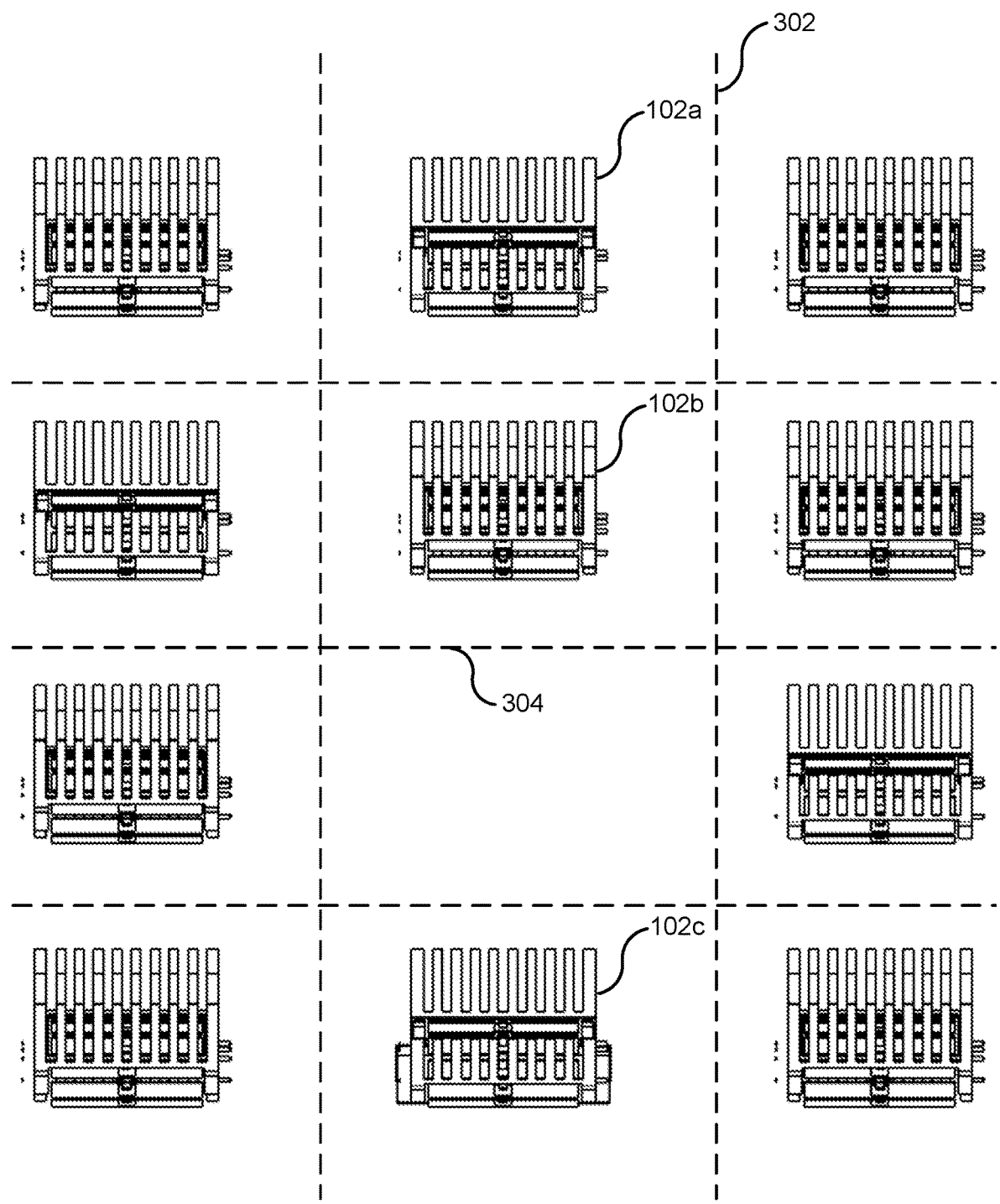
FIG. 3 is an end view that illustrates the item delivery system of FIG. 1, according to various embodiments.

Turning to FIG. 3, an end view of the item delivery system 100 is shown. The conveyors 102 of the item delivery system 100 can be arranged vertically above one another (e.g., in columns 302) and/or horizontally next to one another (e.g., in rows 304). The conveyors 102 can be separated by a horizontal distance that allows for a structure to be positioned between the conveyors 102 and/or allows a user and/or an operator to access the conveyors 102. For example, the support structure 104 can be positioned between the conveyors 102. In various embodiments, the columns 302 and/or the rows 304 of conveyors 102 can be removed (e.g., from the support structure 104 and/or the item delivery vehicle 106. For example, a column 302 of conveyors 102 can be removed and replaced (e.g., a column 302 of empty conveyors 102 can be removed and replaced with a column 302 of conveyors 102 containing items 108).

The conveyors 102 can be vertically separated by a distance that allows items 108 to travel between the conveyors 102. The conveyors 102 can be separated by a distance that is larger than a height of some or all of the items 108. For example, conveyors 102a and 102b can be separated by a distance such that items 108 with a height below a threshold value can be positioned on conveyor 102b without interfering with the operation conveyor 102a.

In various embodiments, two or more of the conveyors 102 can be separated by a vertical distance that is larger than the vertical separation of other conveyors 102. For example, conveyors 102b and 102c can be separated by a larger vertical distance than the vertical separation between conveyors 102a and 102b. The larger vertical separation of the conveyors 102 can allow for items 108 with a height above a threshold value (e.g., oversized items 108) to be received on the conveyors 102 without interfering with the operation of the other conveyors 102. For example, oversized items 108 can be positioned on conveyor 102c without interfering with the operation of conveyor 102b. In some embodiments, the conveyor 102c can move items 108 in a different direction than conveyors 102a and 102b. For example, conveyors 102a and 102b can move the items 108 toward the front of the item delivery vehicle 106 (e.g., towards operator area 204) and the conveyor 102c can move items 108 towards the back of the item delivery vehicle 106 (e.g., towards the access doors 208).

Figure 4A:
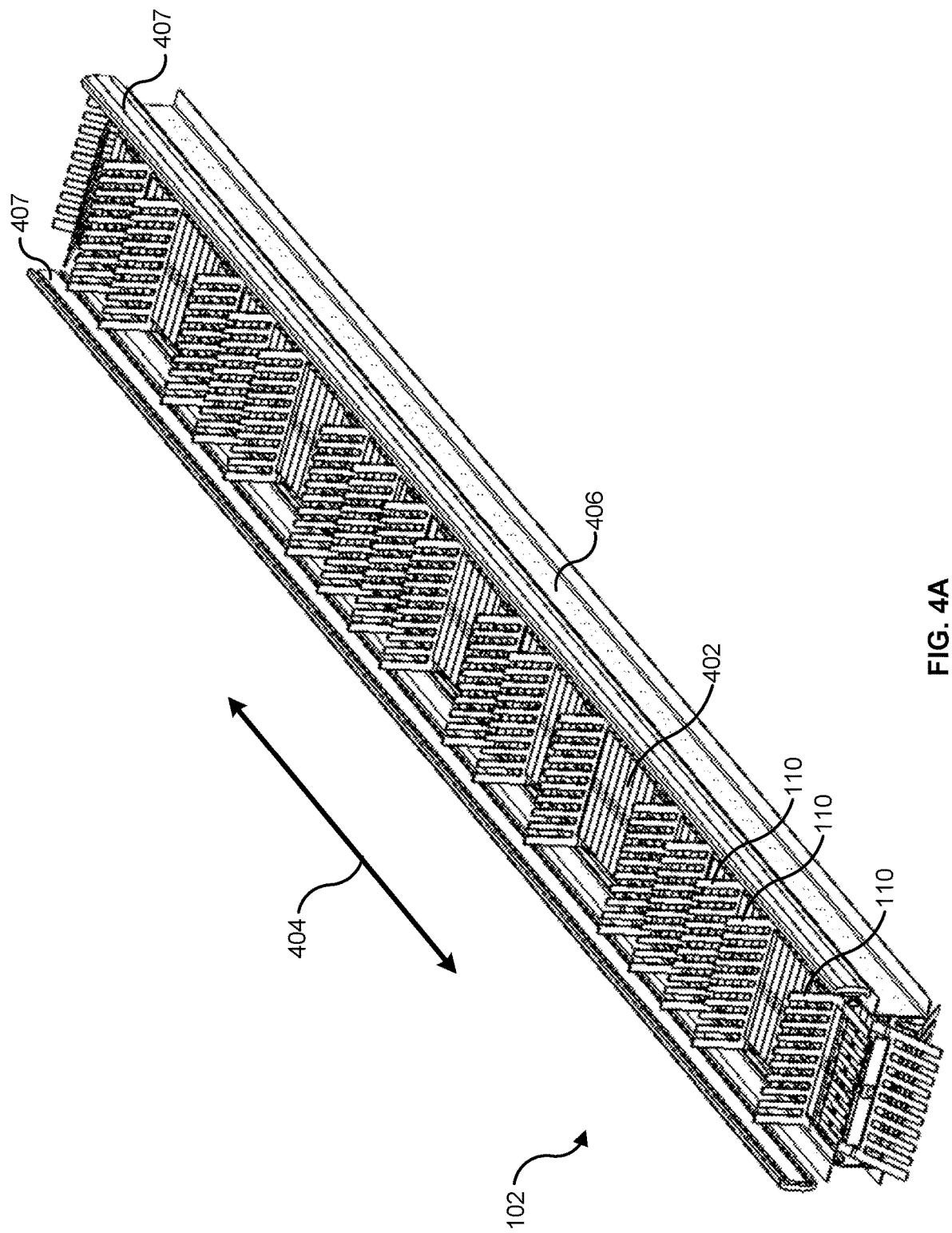
FIG. 4A is a perspective view that illustrates a conveyor for use with the item delivery system of FIG. 1, according to various embodiments.
Figure 4B:
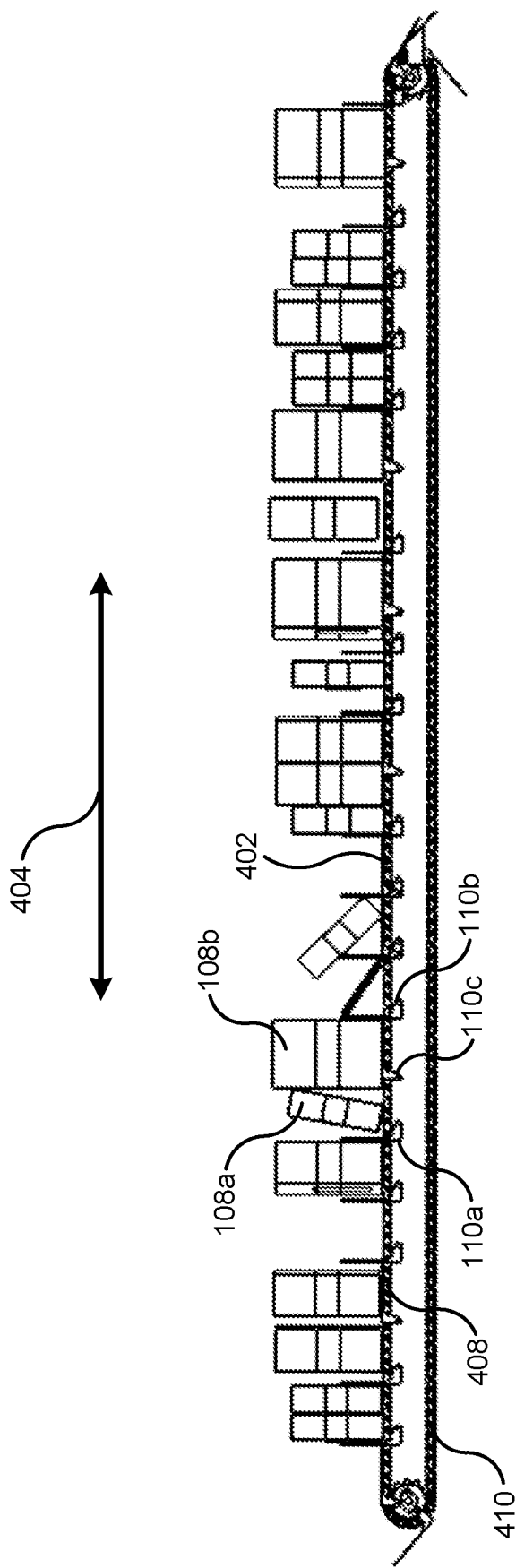
FIG. 4B is a side view of the conveyor of FIG. 4 including items, according to various embodiments.

Turning to FIGS. 4A and 4B, an example conveyor 102 is shown. FIG. 4A is a perspective view of the conveyor 102 and FIG. 4B is a side view of the conveyor 102 including items 108. In FIG. 4B, the conveyor 102 is shown with the guides 406 removed for ease of viewing. As shown in FIG. 4A, the conveyor 102 can include a conveyance surface 402 and dividers 110. The conveyance surface 402 can receive items 108 and transport the items 108 from one end of the conveyor 102 to another end of the conveyor 102 (e.g., along direction 404). The conveyance surface 402 can move the items 108 in one direction and/or multiple directions. For example, the conveyance surface 402 can move the items 108 in a first direction and a second direction opposite the first direction. The conveyance surface 402 can be or include a tabletop chain, a chain, rollers, motor driven rollers, a belt, and/or any suitable surface for supporting and moving items 108. In some embodiments, the conveyance surface 402 can include slats that can pivot relative to one another. For example, the slats can allow the conveyance surface 402 to go around a gear and/or a sprocket.

The conveyance surface 402 can move the items 108 in one direction and/or multiple directions. For example, the conveyance surface 402 can move the items 108 in a first direction and a second direction opposite the first direction. The conveyance surface 402 can move the items 108 to the unloading conveyor 114 based on a customer order. For example, items 108 from a customer order can be positioned on the conveyance surface 402, between dividers 110. The conveyance surface 402 can advance the items 108 of a customer order onto the unloading conveyor 114. In various embodiments, multiple customer orders can be positioned on the conveyance surface 402. Each of the customer orders can be separated by the dividers 110. Additionally or alternatively, multiple orders, for example, multiple orders that are being delivered to the same address can be positioned between the same dividers 110.

The conveyance surface 402 can deposit each of the customer orders on the unloading conveyor 114 one at a time. However, the multiple orders that are being delivered to the same address can be deposited onto the unloading conveyor 114 at the same time. In some embodiments, the customer orders can be arranged on the conveyance surface 402 based on a delivery route and/or schedule. For example, the customer orders that are scheduled to be delivered first can be positioned on the conveyor 102 and moved to the end of the conveyor closest to the unloading conveyor 114. Other customer orders that are along the same route can be loaded onto the conveyor 102 (e.g., between dividers 110 behind the first customer order.

In various embodiments, the conveyor 102 can include guides 406. The guides 406 can be positioned adjacent to the conveyance surface 402 (e.g., on the sides of the conveyance surface 402). The guides 406 can prevent items 108 from falling off of the conveyance surface 402. For example, the guides 406 can prevent items 108 (e.g., round items and/or cylindrical items) from falling off of the conveyance surface 402 when the conveyance surface 402 moves the items 108. The guides 406 can be or include metal, plastic, and/or any suitably rigid material.

In some embodiments, the guides 406 can be or include an adjustable portion 407. The adjustable portion 407 can allow the width and/or height to be changed. For example, the adjustable portions 407 can be moved closer to one another (e.g., to decrease the width) when smaller items 108 are being moved on the conveyor 102. Additionally or alternatively, the adjustable portions 407 can be moved away from one another (e.g., to increase the width) when larger items 108 are being moved on the conveyor 102. In further embodiments, the adjustable portions 407 can be moved upwards to increase the height of the guides 406 (e.g., to accommodate larger items 108). Additionally or alternatively, the height of the adjustable portions 407 can be lowered to decrease the height of the guides 406 (e.g., to accommodate smaller items).

The adjustable portions 407 can be adjusted while the conveyor 102 is in operation (e.g., while moving items 108). However, the adjustable portions 407 may be adjustable when the conveyor 102 is not in operation (e.g., before and/or after items 108 have been loaded on the conveyor 102 but the conveyor 102 is not moving).

As shown in FIG. 4B, the conveyance surface 402 can include an upper portion 408 and a lower portion 410. The upper portion 408 can be used to receive and transport the items 108 and the lower portion 410 can be used to return the dividers 110 and/or the conveyance surface 402 to a position to receive more items 108.

Figure 5A:
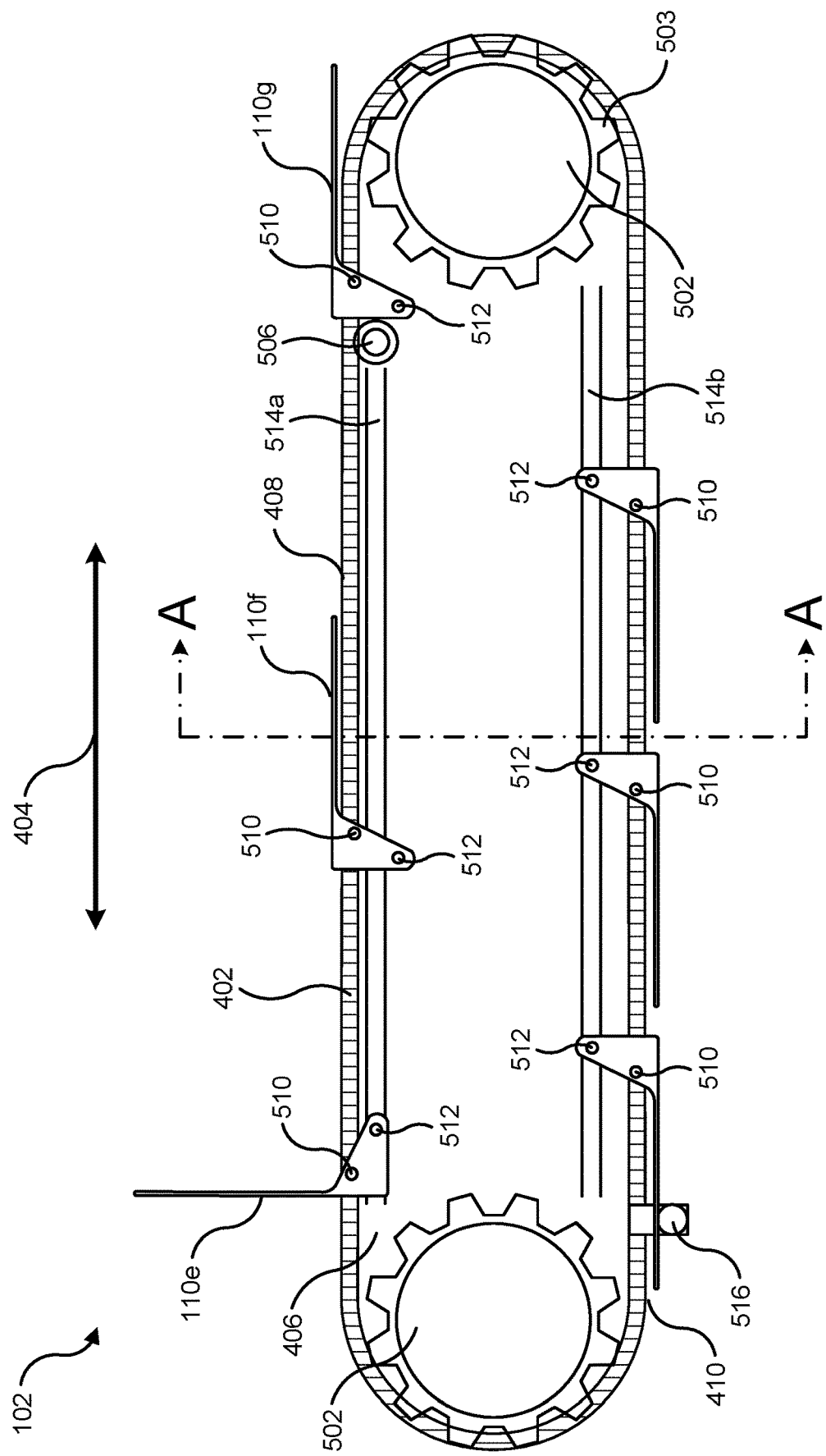
FIG. 5A is a side view of another conveyor for use with the item delivery system of FIG. 1, according to various embodiments.
Figure 5B:
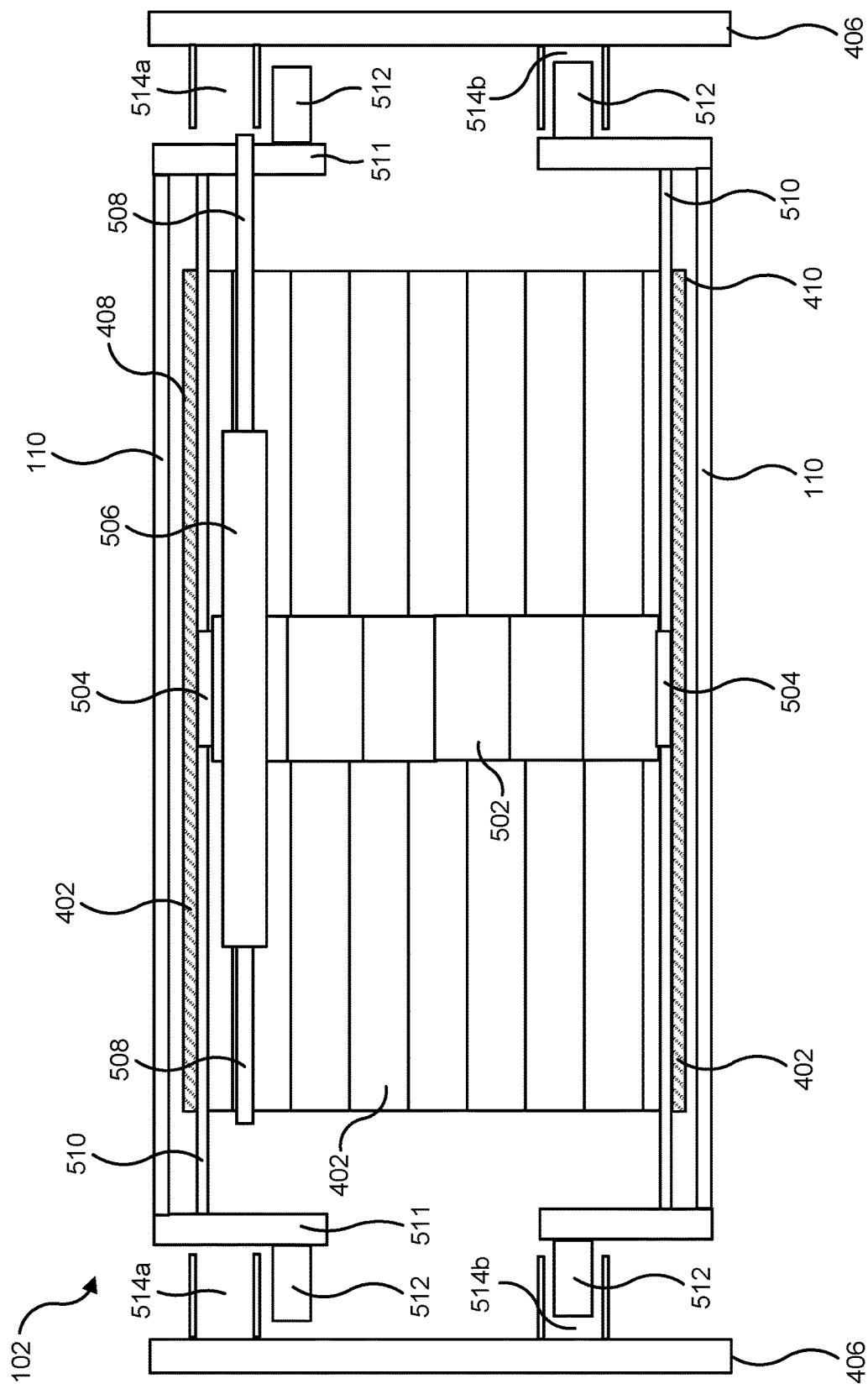
FIG. 5B is cross-sectional view of the conveyor of FIG. 5A, according to various embodiments.

As discussed further in reference to FIGS. 5A and 5B, the dividers 110 can move along the upper portion 408 and/or the lower portion 410. For example, the dividers 110 can be coupled with the conveyance surface 402 and/or the conveyors 102 and move with the conveyance surface 402. In various embodiments, when the dividers 110 are traveling along the upper portion 408, the dividers 110 can be in the operating configuration and/or the storage configuration. For example, dividers 110a and 110b are in the operating configuration (e.g., oriented vertically) and divider 110c is in the storage configuration (e.g., folded flat against the conveyance surface 402). As shown in FIG. 4B, when the dividers 110 are in the storage configuration, items 108 can be positioned on the dividers 110. For example, the items 108 can be positioned on the dividers 110 such that the dividers 110 are between the items 108 and the conveyance surface 402.

In various embodiments, the dividers 110 can be coupled with the conveyance surface 402 at regular intervals (e.g., the dividers 110 can be spaced apart from one another by the same amount). For example, the dividers 110 can be separated by a distance between 2 inches and 12 inches (e.g., 2 inches, 2.5 inches, 3 inches, 3.5 inches, 5 inches, 7.5 inches, 10 inches, 12 inches). However, the dividers 110 can be separated by any suitable distance. In some embodiments, the separation between dividers 110 is based on dimensions of the dividers 110. For example, the separation between dividers 110 is based on the height of the dividers 110 (e.g., the separation can be greater than the height of the dividers 110). For example, the dividers 110 can have a height of 4 inches and the separation between dividers 110 can be 4.5 inches.

The dividers 110 can be separated by a distance that allows one or more items 108 to be positioned between dividers 110. For example, items 108a and 108b can be positioned between dividers 110a and 110b. In various embodiments, the multiple items 108 positioned between dividers 110 can be from the same customer order. For example, a customer order containing multiple items 108 can be grouped together between dividers 110. Additionally or alternatively, items 108 being shipped and/or delivered to locations near one another can be grouped together between dividers 110. For example, items 108 from different customer orders that are being delivered to the same building can be grouped together between dividers 110.

The dividers 110 can keep the items 108 and/or the customer orders separated. For example, the dividers 110 can prevent items 108 from different customer orders from being positioned on the unloading conveyor 114 at the same time. Additionally or alternatively, the dividers 110 can prevent items 108 going to different locations (e.g., addresses and/or delivery locations) from being positioned on the unloading conveyor 114 at the same time. For example, multiple customer orders going to the same delivery location can be positioned between the dividers 110 and unloaded on the unloading conveyor 114 at the same time, without items 108 from other customer orders also being unloaded onto the unloading conveyor 114.

In some embodiments, some or all of the dividers 110 of the conveyor 102 can have the same and/or similar dimensions. For example, all of the dividers 110 can have the same and/or a similar height. However, some or all of the dividers 110 may have different dimensions. For example, the dividers 110 can have different heights.

In further embodiments, some or all of the dividers 110 of the conveyor 102 can be separated by the same and/or a similar distance. For example, all of the dividers 110 can be separated by the same distance. However, some or all of the dividers 110 can be separated by different distances. For example, some dividers 110 can be positioned closer to another divider 110 than to other dividers 110.

Turning to FIGS. 5A and 5B another example conveyor 102 is shown. FIG. 5A is a side view of the conveyor 102. In FIG. 5A, the conveyor 102 is shown with the guide 406 removed for ease of viewing. FIG. 5B is a cross-sectional view of the conveyor 102 taken along line AA. The conveyor 102 can include sprocket 502 (e.g., gears and/or wheels). The sprockets 502 can move the conveyance surface 402 (e.g., along direction 404). The sprockets 502 can interface with a portion of the conveyance surface 402. For example, as shown in FIG. 5B, the sprockets 502 can include teeth 503 which can engage with links 504 positioned below the conveyance surface 402. The sprockets 502 can be driven sprockets (e.g., driven by a motor). However, one or more of the sprockets 502 can be an idle sprocket 502. For example, one of the sprockets 502 can be driven and the other sprocket 502 can be an idle sprocket 502 that is driven by the driven sprocket 502.

In various embodiments, the sprockets 502 can move the conveyance surface 402 and/or the dividers 110 around a loop. The dividers 110 can be coupled with the conveyance surface 402 and can be moved (e.g., by the sprockets 502) between the upper portion 408 and the lower portion 410 (e.g., while the dividers 110 are coupled with the conveyance surface 402). When the dividers 110 are moved along the upper portion 408 the dividers 110 can be in the operating configuration (e.g., divider 110e) and/or in the storage configuration (e.g., dividers 110f and 110g).

Actuator 506 can be used to move the dividers 110 from the storage configuration to the operating configuration. For example, as shown in FIG. 5B, actuator 506 can include one or more extendable rods 508 that can engage with a portion of dividers 110. For example, the extendable rods 508 can engage with an engagement portion 511 of the dividers 110. The engagement portion 511 can extend below the conveyance surface 402. The extendable rods 508 can extend and engage with the engagement portion 511, which can cause the dividers 110 to rotate (e.g., from the storage configuration to the operating configuration). In some embodiments, multiple actuators 506 can be used to rotate the dividers 110. For example, multiple actuators 506 can be positioned below the conveyance surface 402.

The dividers 110 can be rotated based on dimensions of one or more items 108 and/or data associated with an order from a user. For example, a first divider 110 can be rotated to the operating configuration and data associated with an item 108 and/or items 108 can be received. The data can include one or more dimensions of the item 108 and/or items 108. Based on the dimensions of the item 108 and/or items 108 a second divider 110 can be rotated to the operating configuration. For example, if the dividers 110 are separated by 3 inches and the item 108 and/or the items 108 have a length of 8 inches, then the divider 110 positioned 9 inches away from the first divider 110 can be rotated to the operating configuration (e.g., the dividers 110 positioned 3 inches and 6 inches away from the first divider 110 remain in the storage configuration).

The dividers 110 can rotate (e.g., pivot) about axle 510. The axle 510 can extend through a portion of the conveyance surface 402 to connect the dividers 110 and the conveyance surface 402. For example, the axle 510 can extend through the links 504. The axle 510 can act as a pivot point that the dividers 110 rotate about (e.g., from the storage configuration to the operating configuration).

In various embodiments, the dividers 110 can include pins 512 that can be used to keep or maintain the dividers 110 in the storage configuration and/or the operating configuration. For example, the pins 512 can be positioned in grooves 514 to prevent the dividers 110 from pivoting (e.g., lock the dividers 110 in a position). The grooves 514 can be connected to and/or are part of the guides 406. When the dividers 110 are moving along the upper portion 408, the pins 512 can be positioned in the groove 514$a$ to lock the dividers 110 (e.g., by preventing the dividers 110 from rotating) in the operating configuration. Additionally or alternatively, the pins 512 can be positioned below the groove 514$a$ to lock the dividers 110 in the storage configuration. When the dividers 110 are moving along the lower portion 410, the pins 512 can be positioned in the groove 514$b$ to lock the dividers 110 in the storage configuration.

In some embodiments, a support 516 can be positioned below the lower portion 410 to prevent the dividers 110 from rotating prior to the pins 512 entering the groove 514$b$. For example, the support 516 can be positioned to support the dividers 110 and prevent the dividers 110 from rotating (e.g., due to gravity). In further embodiments, the support 516 can be or include a sloped surface (e.g., a ramped surface) that can aid in guiding the pins 512 into the groove 514$b$. For example, the sloped surface can aid in rotating the dividers 110 into the storage configuration to guide the pins 512 into the groove 514$b$.

The support 516 can hold the dividers 110 in the storage configuration until the pins 512 enter the groove 514$b$. The dividers 110 can then be locked in the storage configuration while they travel along the lower portion 410. Locking the dividers 110 in the storage configuration while they travel along the lower portion 410 can prevent the dividers 110 from interfering with other conveyors 102. For example, locking the dividers 110 can prevent the dividers 110 from rotating and contacting dividers 110 and/or items 108 on a conveyor 102 positioned below.

Figure 6B:
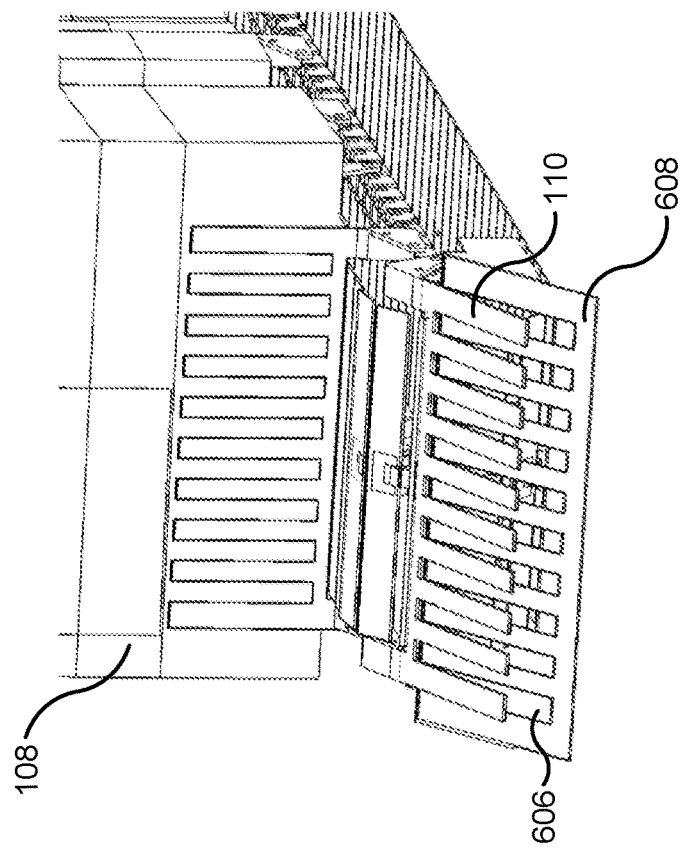
FIGS. 6A and 6B illustrate a divider for use with the item delivery system of FIG. 1, according to various embodiments.
Figure 6A:
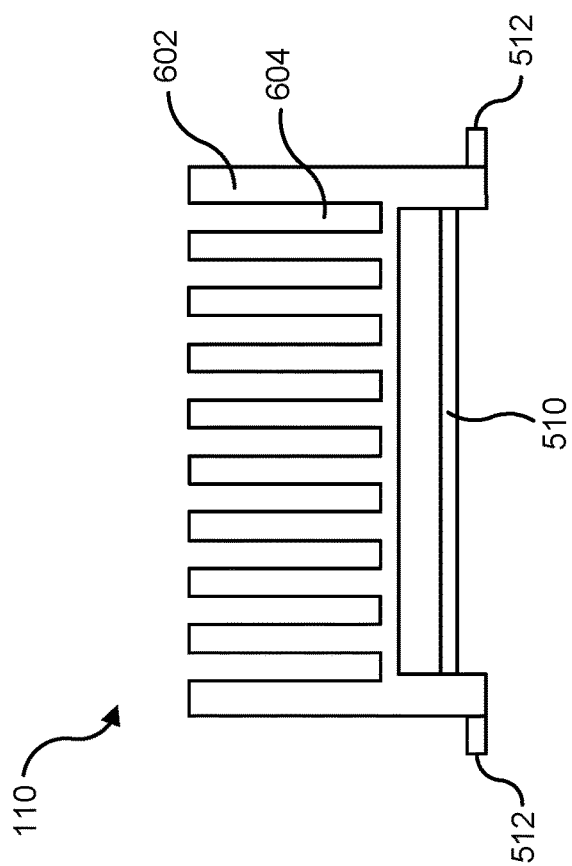

Turning to FIGS. 6A and 6B, an example divider 110 is shown. The divider 110 can include fingers 602. The fingers 602 can be or include pieces of material separated by spaces 604. The fingers 602 can allow the dividers 110 to travel between spaces 606 in an offloading ramp 608. For example, the fingers 602 can be smaller than or similarly sized to the spaces 606 of the offloading ramp 608. The fingers 602 can pass through the spaces 606 (e.g., while traveling from the upper portion 408 to the lower portion 410. The items 108 can remain on the offloading ramp 608 while the fingers 602 pass through the spaces 606. For example, the items 108 can be larger than the spaces 606 such that the items 108 cannot pass through the spaces 606. The offloading ramp 608 can be coupled to the end of the conveyor 102 and/or to the unloading device 112. The offloading ramp 608 can offload the items 108 onto the unloading conveyor 114.

The fingers 602 moving through the spaces 606 can allow the end of the conveyor 102 to be positioned closer to the offloading ramp 608. For example, if the dividers 110 were solid material, the offloading ramp 608 would need to be positioned a distance (e.g., the height of the dividers 110) away from the end of the conveyor 102 (e.g., to allow for clearance of the dividers 110 to be able to pass by the offloading ramp 608). The fingers 602 moving through the spaces 606 can allow for the offloading ramp 608 to be positioned next to the end of the conveyors 102, for example, because the fingers 602 can pass through the spaces 606 and there does not need to be extra clearance for the dividers 110.

In various embodiments, the divider 110 can be or include material that can support the items 108. For example, when the divider 110 is positioned in the storage configuration, items 108 can be positioned on top of the divider 110 without damaging the divider 110. The divider 110 can be or include plastic, metal, carbon-fiber, rubber, and/or any suitable material that can support the items 108.

Figure 7:
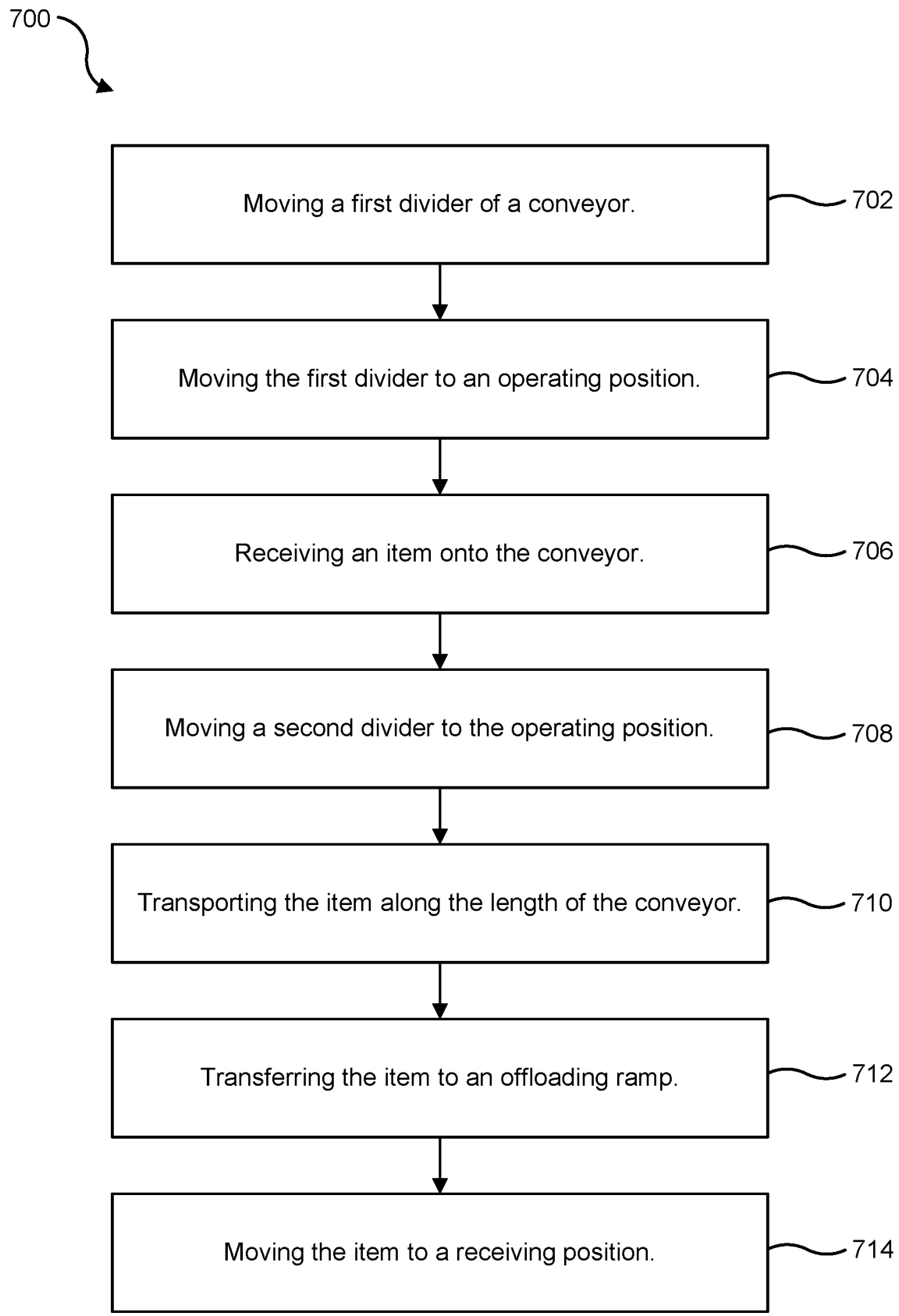
FIG. 7 is a flowchart illustrating a process for delivering items using the item delivery system of FIG. 1, according to various embodiments.

Turning to FIG. 7, a flowchart illustrating a process 700 for delivering an item (e.g., item 108) using an item delivery system (e.g., item delivery system 100) is shown. Various blocks of the process 700 are described by referencing the components shown in FIGS. 8 through 15, however, additional or alternative components may be used with the process 700. FIGS. 8 through 15 illustrate the example process 700 using particular embodiments of the item delivery system 100 of FIG. 1.

Figure 8:
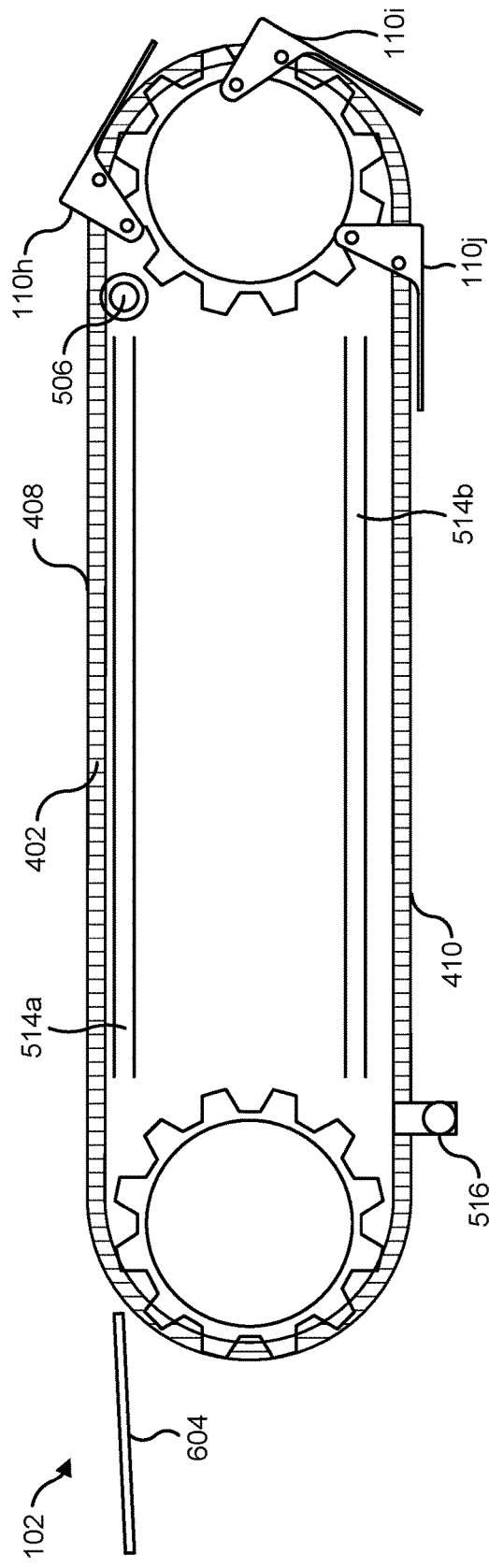

The process 700 at 702 can include moving a first divider (e.g., divider 110$h$) of a conveyor (e.g., conveyor 102). As shown in FIG. 8, the divider 110$h$ can be moved along a conveyance surface 402 of the conveyor 102. The divider 110$h$ can be moved in the storage configuration (e.g., with the divider 110$h$ laying down against the conveyance surface 402). The divider 110$h$ can be moved from a lower portion 410 to an upper portion 408 of the conveyance surface 402.

Figure 9:
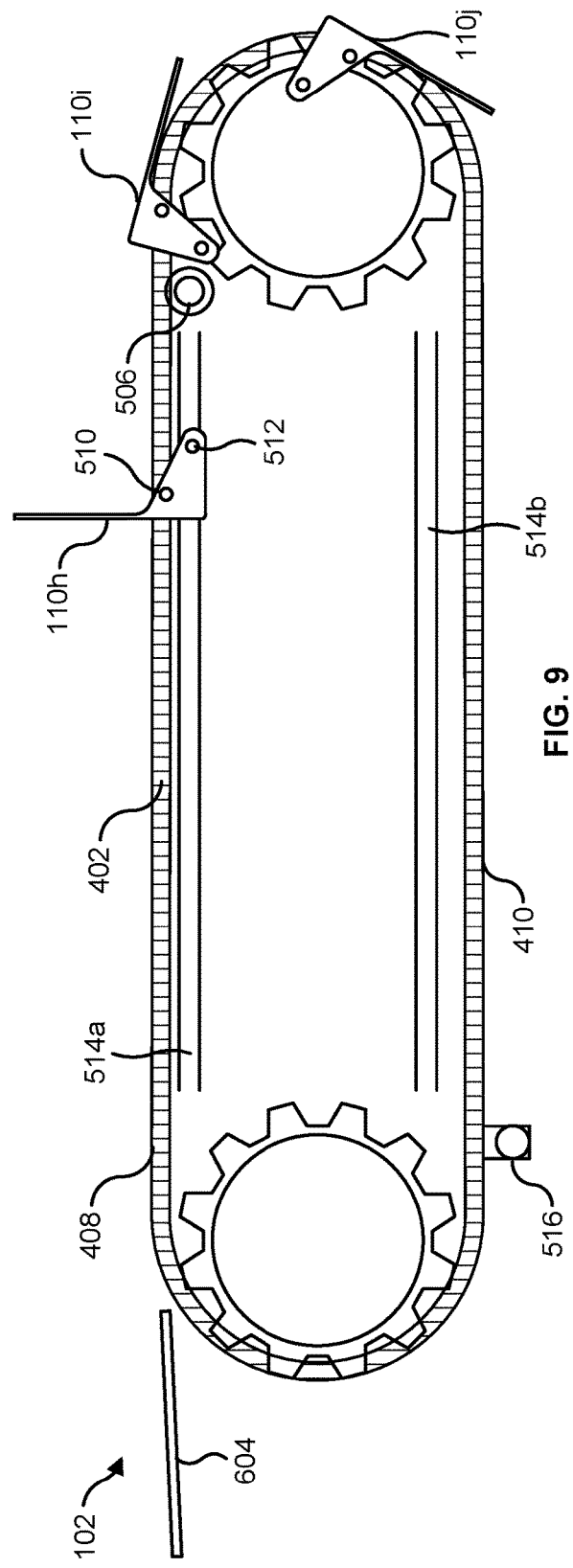

The process 700 at 704 can include moving the divider 110$h$ to an operating configuration (e.g., from the storage configuration). As shown in FIG. 9, in the operating configuration, the divider 110 can be extending vertically or substantially vertically from the conveyance surface 402. The divider 110$h$ can be moved to the operating configuration along the upper portion 408. The divider 110$h$ can be moved to the operating configuration by an actuator (e.g., actuator 506). The actuator 506 can cause the divider 110$h$ to rotate (e.g., about axle 510) from the storage configuration to the operating configuration. In the operating configuration, pin 512 can enter groove 514$a$. The pin 512 in the groove 514$a$ can prevent the divider 110$h$ from rotating further (e.g., the pin 512 in the groove 514$a$ can prevent the divider 110$h$ from rotating back into the storage configuration).

Figure 10:
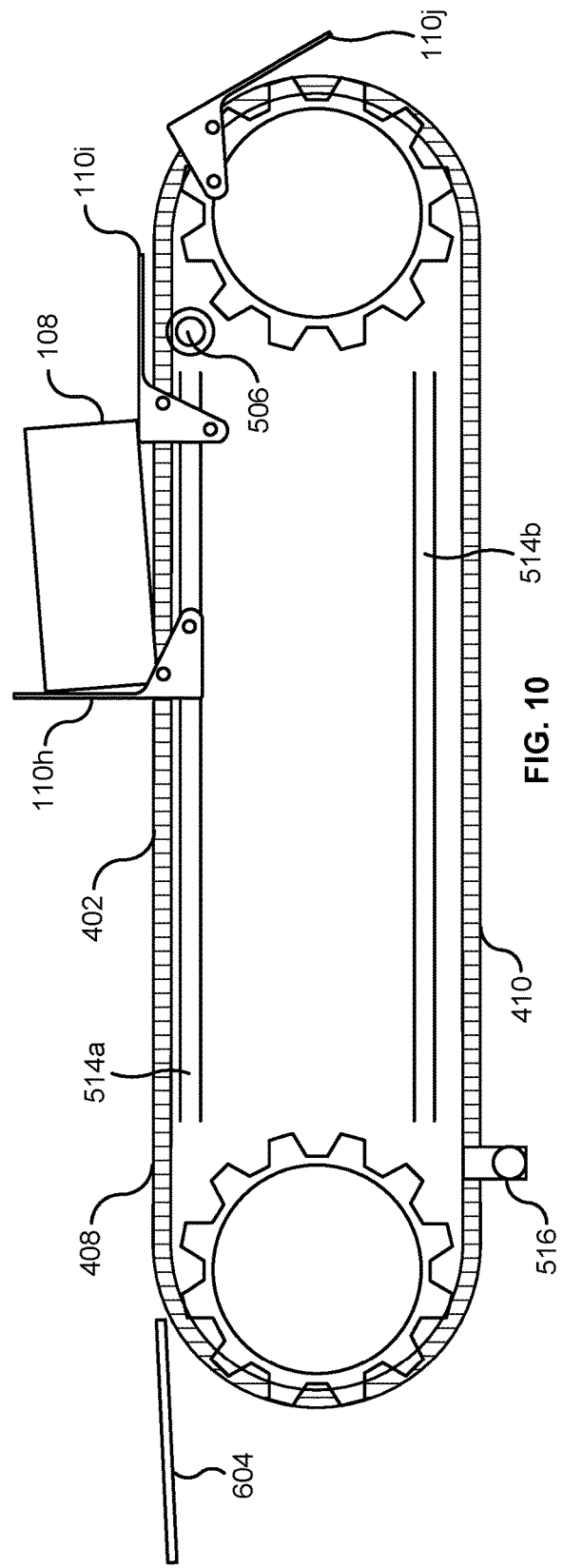

The process 700 at 706 can include receiving an item (e.g., item 108) onto the conveyor 102. As shown in FIG. 10, the item 108 can be positioned on the conveyance surface 402 and/or on a divider (e.g., divider 110$i$). For example, divider 110$i$ can remain in the storage configuration and receive the item 108. For example, the actuator 506 may retract to allow the divider 110$i$ to pass by without being toggled to the operating configuration.

Figure 11:
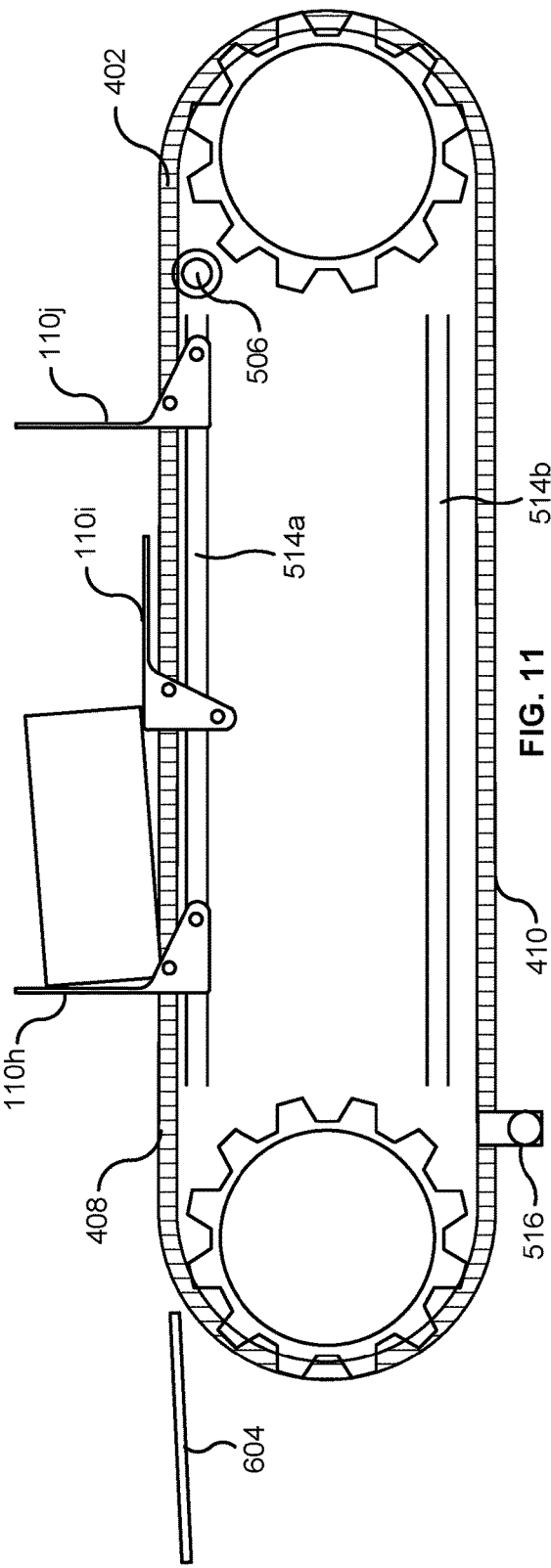

The process 700 at 708 can include moving a second divider (e.g., divider 110$j$) to the operating configuration. As shown in FIG. 11, the divider 110$j$ can be positioned on an opposing side of the item 108 from the divider 110$h$ (e.g., the item 108 can be positioned between divider 110*h* and 110*j*). The divider 110*j* can be moved to the operating configuration using actuator 506.

The process 700 at 710 can include transporting the item 108 along the length of the conveyor 102. As shown in FIG. 12, the item 108 can be transported along the length of the conveyor 102 to an offloading ramp 608. The item 108 can be transported by indexing the item 108 and/or in a continuous motion.

The process 700 at 712 can include transferring the item to the offloading ramp 608. As shown in FIG. 13, the item 108 can be transferred to the offloading ramp by having a portion of the divider 110*h* pass through a portion of the offloading ramp 608. The item 108 can remain on the offloading ramp 608 and be transferred to, for example, an unloading conveyor 114.

The process 700 at 714 can include moving the item 108 to a receiving position. The item 108 can be moved to the receiving position with the unloading conveyor 114. For example, the unloading conveyor 114 can receive the item 108 and position the item 108 for receipt by a user and/or an operator, such as in the item removal area 212.

Figure 14:
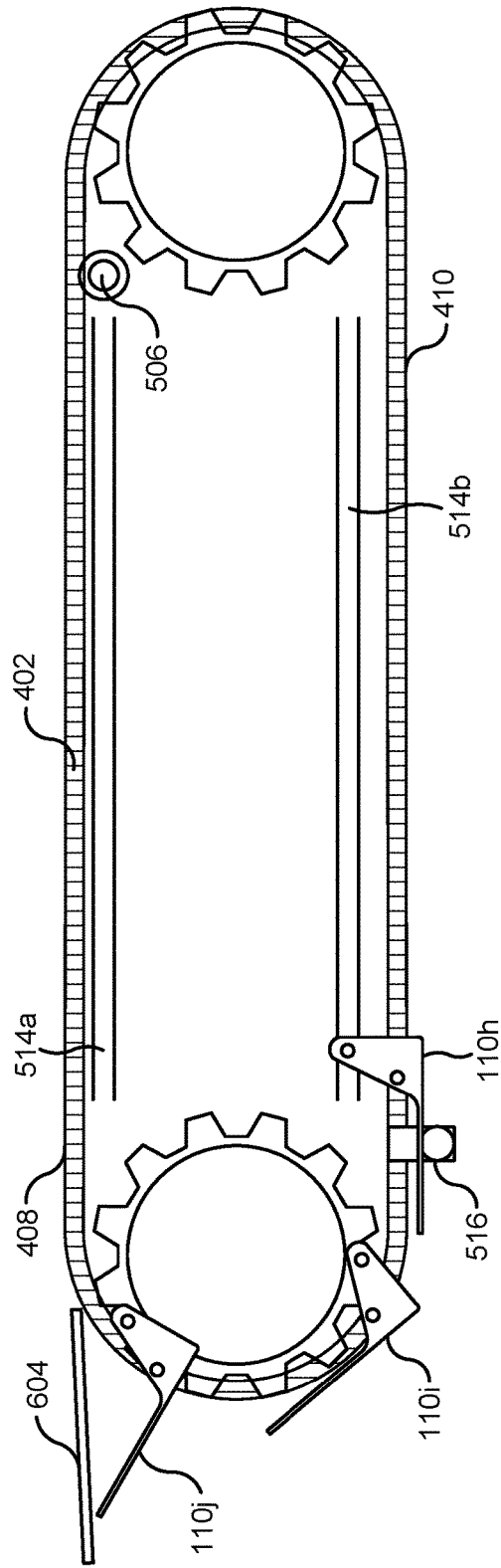
Figure 15:
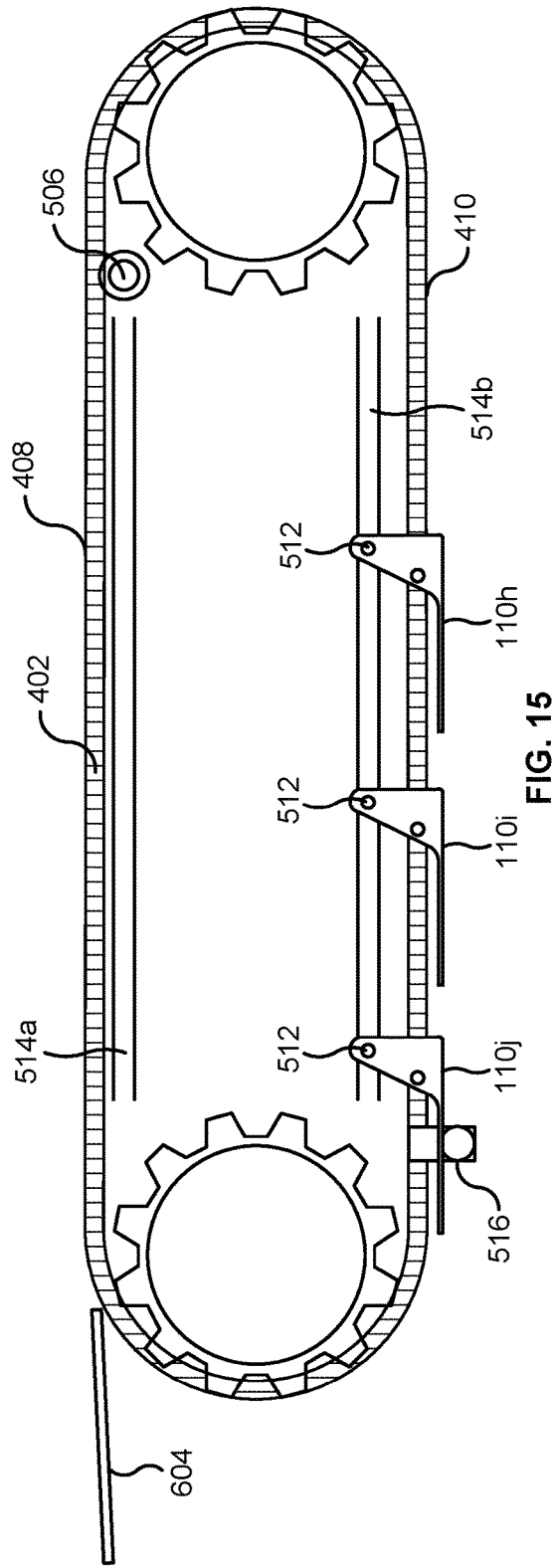

As shown in FIGS. 14 and 15, the dividers 110*h*, 110*i*, and 110*j* can continue to travel along the conveyor 102. For example, the dividers 110*h*, 110*i*, and 110*j* can travel along the lower portion 410 of the conveyance surface 402. The dividers 110*h*, 110*i*, and 110*j* can travel along the lower portion 410 in the storage configuration. The support 516 can help guide the pins 512 into the groove 514*b*. For example, the support 516 can support the dividers 110*h*, 110*i*, 110*j* to guide the pins 512 into the groove 514*b*. The dividers 110*h*, 110*i*, and 110*j* can be held in the storage configuration while traveling along the lower portion 410 by pins 512 entering groove 514*b*. The pin 512 in the groove 514*b* can prevent the dividers 110*h*, 110*i*, and 110*j* from rotating (e.g., from falling due to gravity).

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An item delivery system, comprising:
   a support structure positioned in an item delivery vehicle;
   a plurality of conveyance assemblies coupled with the support structure and forming one or more levels arranged vertically above one another, each of the conveyance assemblies comprising:
      a conveyance surface configured to receive items and transport the items along a length of the conveyance assembly, the conveyance surface having an upper portion and a lower portion; and
      rotatable dividers coupled with the conveyance surface and moveable between a storage configuration and an operating configuration based on a dimension of an item received on the conveyance surface, wherein when the rotatable dividers are in the storage configuration, the rotatable dividers are flat against the conveyance surface and when the rotatable dividers are in the operating configuration, the rotatable dividers are positioned between items; and
   an unloading conveyor configured to receive the items transported by the conveyance surface.

2. The item delivery system of claim 1, wherein each rotatable divider comprises an engagement portion extending between the upper and lower portions of the conveyance surface and an axle extending through a portion of the conveyance surface.

3. The item delivery system of claim 2, further comprising an actuator positioned below the conveyance surface, the actuator configured to engage with the engagement portions of the rotatable dividers extending between the upper and lower portions of the conveyance surface to cause rotation of the rotatable dividers about the respective axles for movement between the storage configuration and the operating configuration.

4. The item delivery system of claim 1, wherein:
when the rotatable dividers are moving along the upper portion, the rotatable dividers are in the storage configuration or the operating configuration; and
when the rotatable dividers are moving along the lower portion, the rotatable dividers are in the storage configuration.

5. The item delivery system of claim 1, wherein each of the conveyance assemblies further comprises one or more grooves, each of the one or more grooves configured to receive a pin of each of the rotatable dividers.

6. The item delivery system of claim 5, wherein when the pins of the rotatable dividers are positioned in a groove of the one or more grooves, the rotatable dividers are stopped from rotating between the operating configuration and the storage configuration.

7. The item delivery system of claim 5, wherein when the rotatable dividers are moving along the upper portion of the conveyance surface, the pins are positionable in a groove of the one or more grooves when the rotatable dividers are in the operating configuration.

8. The item delivery system of claim 5, wherein when the rotatable dividers are moving along the lower portion of the conveyance surface, the pins are positionable in a groove of the one or more grooves when the rotatable dividers are in the storage configuration.

9. A method for retrieving an item, the method comprising:
rotating a first rotatable divider from a storage configuration, where the first rotatable divider is flat against a conveyance surface, to an operating configuration, where the first rotatable divider extends from the conveyance surface;
receiving an item on the conveyance surface;
receiving data associated with the item, the data comprising one or more dimensions of the item;
rotating a second rotatable divider from the storage configuration to the operating configuration, the second rotatable divider positioned on an opposite side of the item from the first rotatable divider; and
transporting the item between the first and second rotatable dividers.

10. The method of claim 9, wherein rotating the first rotatable divider comprises operating an actuator to engage with a portion of the first rotatable divider to cause rotation of the first rotatable divider about an axle extending through the conveyance surface.

11. The method of claim 9, further comprising:
receiving the item on an unloading conveyor; and
transporting, with the item on the unloading conveyor, the item to a position for removal of the item from the unloading conveyor.

12. The method of claim 11, further comprising rotating the first and second rotatable dividers from the operating configuration to the storage configuration.

13. A conveyance assembly, comprising:
a conveyance surface configured to receive a plurality of items; and
a plurality of rotatable dividers coupled with the conveyance surface, each of the plurality of rotatable dividers moveable between a storage configuration where the rotatable divider is flat against the conveyance surface and an operating configuration where the rotatable divider is positioned between items, wherein at least one of:
at least one of the plurality of rotatable dividers comprises extensions separated by openings, the extensions configured to pass through openings defined by an unloading device; or
the conveyance assembly further comprises guides positioned on opposing sides of the conveyance surface, each of the guides comprising one or more grooves configured to receive a portion of the rotatable dividers.

14. The conveyance assembly of claim 13, wherein at least one of the plurality of rotatable dividers comprises extensions separated by openings, the extensions configured to pass through openings defined by an unloading device.

15. The conveyance assembly of claim 13, further comprising guides positioned on opposing sides of the conveyance surface, each of the guides comprising one or more grooves configured to receive a portion of the rotatable dividers.

16. The conveyance assembly of claim 15, wherein, when the portion of the rotatable dividers is positioned in one of the one or more grooves, the rotatable dividers are stopped from moving between the storage configuration and the operating configuration.

17. The conveyance assembly of claim 15, further comprising a support configured to engage with the rotatable dividers to position the portion of the rotatable dividers in a groove of the one or more grooves.

18. The conveyance assembly of claim 13, wherein, when the rotatable dividers are in the storage configuration, the rotatable dividers are configured to receive one or more items.

19. The conveyance assembly of claim 13, wherein the conveyance surface comprises an upper portion and a lower portion, and wherein the conveyance assembly further comprises an actuator positioned between the upper and lower portions, the actuator configured to engage a portion of the rotatable dividers to cause the rotatable dividers to rotate about the conveyance surface.

\* \* \* \* \*